Patented Mar. 24, 1942

2,277,588

UNITED STATES PATENT OFFICE 2,277,588

MANUFACTURE OF PHTHALOCYANINE DYESTUFFS

Norman Hulton Haddock, Blackley, Manchester, England, assignor to Imperial Chemical Industries Limited, a corporation of Great Britain No Drawing. Application June 14, 1940, Serial No. 340,620. In Great Britain June 21, 1939

5 Claims. (Cl. 260—314)

This invention relates to the manufacture of dyestuffs and intermediates for dyestuffs.

According to the invention tetrapyridyl phthalocyanines are obtained by bringing into reaction a tetradiazotised tetra-aminophthalocyanine and pyridine.

The tetradiazotised tetra-aminophthalocyanines used as starting materials in this invention are obtainable as described in the specification of my co-pending application Serial No. 335,871, that is by reacting with sodium nitrite and hydrochloric acid upon the corresponding tetraamino-phthalocyanines. The latter in turn may be prepared by reducing the corresponding tetranitro-phthalocyanines according to the same copending application, or by splitting off the acetyl group from tetra-acetylamino-phthalocyanines according to U. S. Patent No. 2,133,340.

The interaction with pyridine according to this invention is conveniently brought about by mixing together the tetra-diazo compound and pyridine by adding an aqueous solution of the tetradiazo compound to the pyridine in excess. Nitrogen is evolved.

The products obtained are, as indicated, tetrapyridyl phthalocyanines. They are, however, most probably not chemical individuals, but mixtures of isomerides as the situation or relation one to another of the original four amino groups that are diazotised to give the tetradiazo compounds used as starting materials is unknown. Hence it follows that the situation or relation one to another, or, in other words, the orientation of the pyridyl radicals, is unknown, except that they are in either the 3- or the 6-, or in the 4- or the 5-position according as the parent phthalic derivatives are numbered. Furthermore, the pyridyl radical may become attached so as to constitute an $\alpha$, $\beta$ or $\gamma$-pyridyl radical, or a mixture of such derivatives may be produced.

The compounds are useful as pigment dyestuffs. Their quaternary derivatives, made as described in co-pending U. S. application Serial No. 305,562, are useful as direct dyestuffs for cotton and other cellulosic materials.

The invention is illustrated but not limited by the following examples, in which the parts are by weight.

Example 1

The tetradiazo solution from 12.3 parts of copper tetra-(4)-aminophthalocyanine, made as described below, is added during ½ hour with stirring to 260 parts of pyridine at 40-45° C. During the addition of the tetradiazo solution there is a brisk evolution of nitrogen. The temperature is then raised to 80° C. and the mixture stirred thereat for 5 minutes. It is then cooled and the green precipitate filtered off, washed with hot water and dried. The product, copper tetra-(4)-pyridylphthalocyanine, is a dark blue powder, soluble in concentrated hydrochloric acid to give a bright green solution and in concentrated sulphuric acid to give a yellow solution. The above tetrazo solution is made as follows:

12.3 parts of finely divided copper tetra-(4)-amino-phthalocyanine (Examples 1, 2, 3 and 4 of copending application, Serial No. 335,871) are mixed with 150 parts of water. A solution of 6 parts of sodium nitrite in 20 parts of water is added. The mixture is cooled to 5° C. and quickly added to 90 parts of concentrated hydrochloric acid with good stirring at 0-5° C. An almost clear dark green solution of the tetra-diazo compound is obtained.

Example 2

42.5 parts of copper tetra-(4)-aminophthalocyanine paste of solid content 11.7%, equivalent to 5 parts of copper tetra-(4)-aminophthalocyanine, and 85 parts of water are mixed and 60 cc. of 35% hydrochloric acid added quickly with good agitation. The finely divided blue suspension so obtained is cooled to 5° C. and a solution of 3.25 parts of sodium nitrite in 32.5 parts of water added quickly. The temperature during the addition is kept at 8-10° C. An intensely green solution of tetra-diazotised copper tetra-(4)-aminophthalocyanine is obtained. After stirring for 1 minute the diazo-solution is added during 5 minutes to 150 parts of stirred pyridine at 40° C. The addition is accompanied by the evolution of nitrogen; the temperature rises to 55-6° C. When the reaction, at first vigorous, slackens, heat is applied to maintain the temperature at 40-45° C. for 30 minutes. The flocculent green precipitate of copper tetra-(4)-pyridylphthalocyanine is filtered off, washed with water and dried.

The product forms a dark blue purple-lustred solid which dissolves in strong hydrochloric acid giving a green solution and in strong sulphuric acid or 10% oleum giving a yellowish-brown solution which on dilution with water yields a bright green precipitate of copper tetra-(4)-pyridylphthalocyanine in a finely divided form.

Example 3

42.5 parts of copper tetra-(4)-aminophthalocyanine paste of solid content 11.7% (equivalent to 5 gms. of solid) are diazotised as described in Example 2. The diazo-solution is added during 3 minutes with good agitation to a mixture of 150 parts of pyridine and 50 parts of 35% sodium hydroxide solution at 35-40° C. Evolution of nitrogen occurs and the reaction is brought to completion by heating at 40-45° C. for 30 minutes. The product is isolated as that of Example 2 and has similar properties.

*Example 4*

5 parts of cobalt tetra-(4)-aminophthalocyanine in the form of a 10% aqueous paste are added with rapid stirring to 60 parts of 33% hydrochloric acid. 70 parts of water are added, the mixture is cooled to 5° C. and 32.5 parts of a 15% sodium nitrite solution is added quickly. Stirring is continued for 2 minutes and the bright green diazo solution is then poured quickly into 150 parts of pyridine (B. P. 115-120°) with rapid stirring. During the addition, the temperature is allowed to rise to 50°; nitrogen is evolved and the reaction is completed by heating the mixture at 45-50° for ½ hour. The precipitate is filtered, washed with water and dried. The product, cobalt tetra-(4)-pyridylphthalocyanine, is a dark powder insoluble in concentrated hydrochloric acid but dissolving in concentrated sulphuric acid to give an olive green solution.

I claim:

1. Process for the manufacture of tetrapyridylphthalocyanines comprising bringing tetradiazotised tetra-amino-phthalocyanines into reaction contact with pyridine.

2. Modification of process claimed in claim 1 in which the tetra-aminophthalocyanine is copper tetra-amino-phthalocyanine.

3. A process for the manufacture of a tetrapyridyl phthalocyanine, which comprises admixing an aqueous solution of the corresponding tetradiazo phthalocyanine with an excess of pyridine, warming the mixture until nitrogen is no longer involved, and recovering the precipitated coloring matter.

4. A process for the manufacture of tetrapyridyl copper-phthalocyanine, which comprises admixing an aqueous solution of tetradiazo-copper-phthalocyanine with an excess of pyridine, warming the mixture until nitrogen is no longer involved, and recovering the precipitated coloring matter.

5. A process for the manufacture of tetrapyridyl cobalt-phthalocyanine, which comprises admixing an aqueous solution of tetradiazo-cobalt-phthalocyanine with an excess of pyridine, warming the mixture until nitrogen is no longer involved, and recovering the precipitated coloring matter.

NORMAN HULTON HADDOCK.